April 2, 1929.　　　R. HARDEN　　　1,707,305
CIRCUIT CLOSER
Filed Nov. 16, 1926　　　2 Sheets-Sheet 2
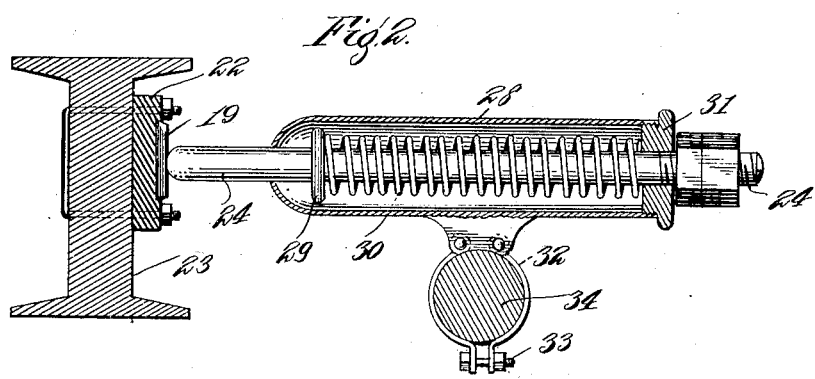

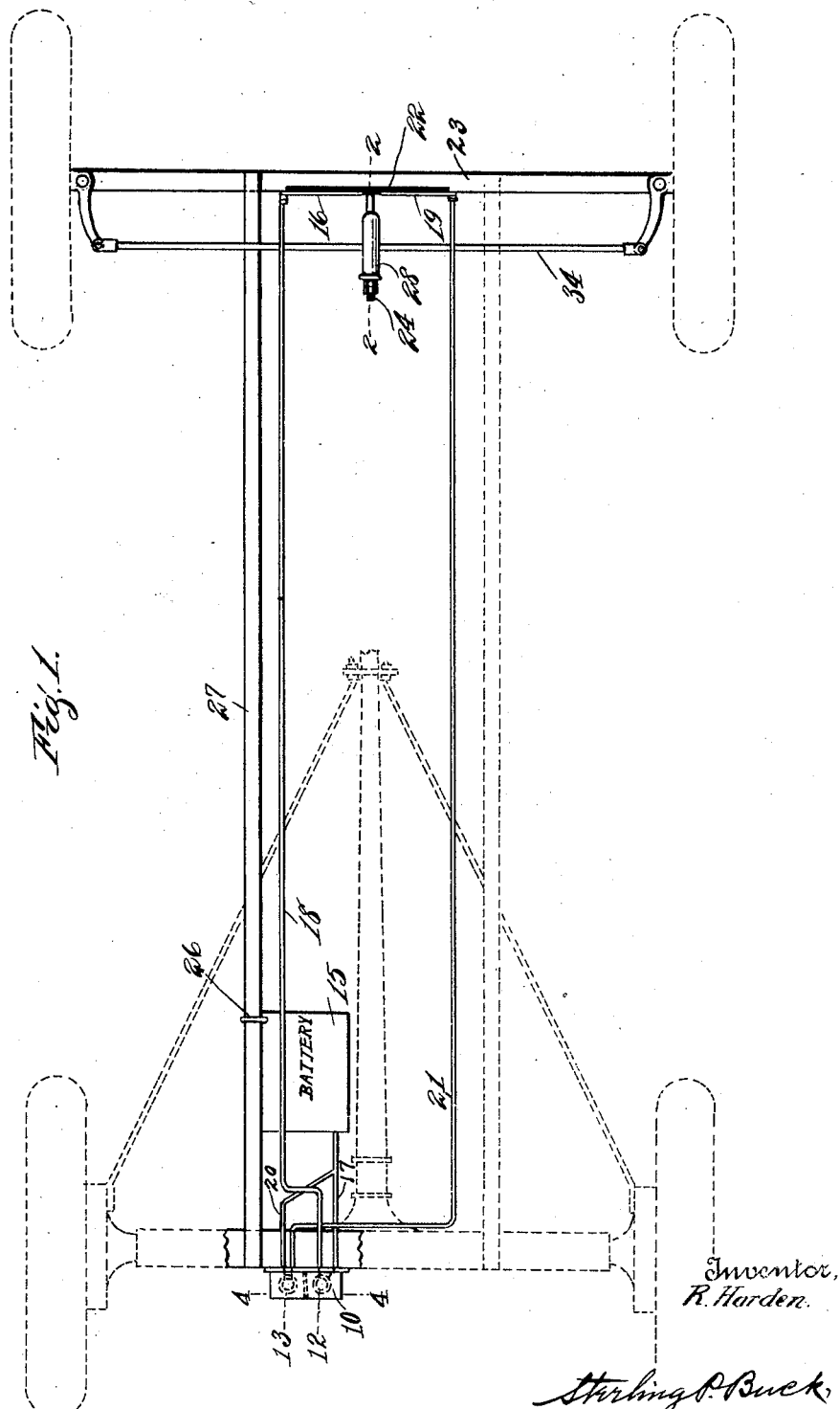

Patented Apr. 2, 1929.

1,707,305

UNITED STATES PATENT OFFICE.

RICHARD HARDEN, OF CHESTNUT HILL, MASSACHUSETTS.

CIRCUIT CLOSER.

Application filed November 16, 1926. Serial No. 148,705.

This invention relates to circuit closers, and also to electric make-and-break devices.

One object of this invention is to provide a simple and comparatively inexpensive signaling device for indicating when the driver of an automobile is beginning to turn the automobile rightward or leftward while driving at night.

Another object is to provide a device of this character which, by slight modifications, can be attached to most every type of automobile now generally in use, and without materially changing the automobile to adapt it for attachment of the device.

Other objects and important features are pointed out or implied in the following details of description, in connection with the accompanying drawings in which:

Figure 1 is a top plan view illustrating my improved signal as applied to an automobile of modern type, the chassis, axles and wheels of the automobile being shown in dotted lines.

Figure 2 is an enlarged sectional view in a vertical plane indicated by the line 2—2 of Fig. 1.

Figure 3 is a rear elevation of the light casing which includes the left-turn and right-turn signs.

Figure 4 is a sectional view, the section being in a vertical plane indicated by the line 4—4 of Figure 1.

Fig. 5 is a perspective view showing the dual contact plate or insulating member which contains the two stationary electric contacts between which the movable contact rests when the automobile is going in a straight path.

Referring to these drawings in detail, in which similar reference characters correspond to similar parts throughout the several views, and in which the parts in dotted lines are shown merely to illustrate the application of the invention, and not referred to in detail:

The invention essentially includes a light-casing 10 which has a partition 11 therein, and lights 12 and 13 in the compartments on opposite sides of the partition 11. The rear side or face of the casing 10 has a window 14 therein, this window being provided with any form of signs which are suitable for indicating the direction in which the automobile is turning. The electric lamps 12 and 13 are adapted to be lighted separately, by means presently described, in such manner that the left-turn sign will be illuminated while the right-turn sign is unilluminated.

The terminals of the lamp 12 are connected respectively with a battery 15 and a contact plate 16 through the medium of conductors 17 and 18; and the terminals of the lamp 13 are connected respectively with the battery 15 and a contact plate 19 through the medium of conductors 20 and 21. The contact plates 16 and 19 are preferably dove-tailed into an insulating plate 22 and secured (by any suitable means not shown) to this insulating member or plate 22 which is secured on the automobile's front axle 23 by a U-bolt or other suitable means, as more clearly shown in Figure 2. The contact plates 16 and 19 are spaced a slight distance from one another, and have their adjacent ends beveled for permitting a plunger to be normally disposed therebetween, and to slide upon the beveled ends of these contact plates, one or the other, according to the direction in which the automobile is turning. This plunger 24 is provided with a threaded rear end having adjusting nuts thereon to hold the plunger 24 out of contact with the insulating plate 22, but permitting it to move into contact with the conducting plates or contacts 16 and 19. It will be seen that the nuts on the plunger 24 can be moved further rearward to permit the plunger to move further forward if this is found necessary.

The plunger 24 is slidably mounted through a tubular casing 28 and has an abutment 29 thereon against which a helical spring 30 is seated. This spring is compressed between the abutment 29 and a removable end 31 which is preferably in the form of a screw-plug and is also a bearing through which the plunger 24 slides. The casing 28 has its lower side provided with a clamp 32 which preferably includes two arcuate and somewhat bendable metal straps provided with a bolt 33 through their ends and adapted to embrace and clamp the cross-rod 34 which connects the knuckle-arms by means of which the front wheels are turned rightward or leftward by any of the usual or well-known steering mechanisms (not shown). It is understood (by those familiar with automobile steering devices) that this rod 34 moves leftward for turning the front wheels rightward, and moves rightward for turning the front wheels leftward; also that it moves slightly towards and from the axle 23, hence towards and from the contact plates 16 and 19, the distance of this movement being in proportion to the distance the knuckle-arms are swung for turning the wheels; and the foregoing explains the necessity for having the spring 30 to press the plunger 24 so it will always be in contact either with the plate 16 or the plate 19 when the front wheels of the automobile are turned to any appreciable extent.

In operation, presuming that the driver is turning the front wheels leftward, but that this is unnoticed by a party approaching from the rear in an automobile, such approaching party and automobile would be likely to collide with this turning automobile if the illuminated signal in the casing 10 would be absent. However, the presence of this illuminated signal, being relatively near to the approaching party, attracts attention of such party and shows him that this automobile is starting to turn leftward; for as it starts to turn leftward, the plunger 24 moves into contact with the contact plate 19 and closes the contact through the medium of plunger 24, casing 28, clamp 32, rod 34 and its connections with the axle 23, the chassis-beam 27, battery-connection 26, battery 15, conductor 20, lamp 13, and conductor 21 back to the contact plate 19.

From the foregoing, it will be seen that I have provided a simple and effective device which can be quickly and easily attached to almost every type of automobile of modern construction, and which very effectively changes the right-turn and left-turn signals according to the respective directions of turning of the automobile.

I have no intention of limiting my patent protection to the exact construction and arrangement here shown and described, but changes may be made within the scope of the inventive ideas as implied and claimed.

What I claim as my invention is:

In a circuit closer for an automobile signal, the combination of an insulating plate provided with means to secure it to the front axle of an automobile, spaced contact strips on said insulating plate and provided with means to connect them to electric conductors of a signalling circuit, a tubular casing provided with means to secure it on the steering cross-rod which extends parallel to said axle, a plunger in and extending from opposite ends of said casing and provided with adjusting means on one end, the other end of said plunger being adapted to move alternately into and out of contact with said contact strips as the steering cross-rod moves longitudinally in opposite directions, and a spring surrounding said plunger and yieldingly holding it in its normal adjusted position, substantially as shown, for the purpose specified.

In testimony whereof I affix my signature.

RICHARD HARDEN.